(12) United States Patent
Miyazaki

(10) Patent No.: US 11,139,749 B2
(45) Date of Patent: Oct. 5, 2021

(54) SEMICONDUCTOR DEVICE

(71) Applicant: RENESAS ELECTRONICS CORPORATION, Tokyo (JP)

(72) Inventor: Toshihiro Miyazaki, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 16/860,775

(22) Filed: Apr. 28, 2020

(65) Prior Publication Data
US 2020/0403525 A1 Dec. 24, 2020

(30) Foreign Application Priority Data

Jun. 24, 2019 (JP) .............................. JP2019-116803

(51) Int. Cl.
H02M 7/145 (2006.01)
H02M 7/155 (2006.01)
H02M 1/08 (2006.01)
H02M 1/32 (2007.01)
H02M 1/42 (2007.01)

(52) U.S. Cl.
CPC ......... H02M 7/1557 (2013.01); H02M 1/083 (2013.01); H02M 1/32 (2013.01); H02M 1/4225 (2013.01)

(58) Field of Classification Search
CPC .... H02M 7/145; H02M 7/155; H02M 7/1555; H02M 7/1557; H02M 1/08; H02M 1/083; H02M 1/32; H02M 1/4225
See application file for complete search history.

(56) References Cited

U.S. PATENT DOCUMENTS

| 6,055,167 A | 4/2000 | Shamkovich et al. |
| 2008/0278296 A1* | 11/2008 | Noh .......................... H04B 3/54 375/259 |
| 2012/0112651 A1 | 5/2012 | King et al. |
| 2014/0097747 A1 | 4/2014 | Bader |

(Continued)

FOREIGN PATENT DOCUMENTS

| CN | 109861356 A | 6/2019 |
| EP | 0 224 198 A2 | 6/1987 |
| EP | 2 498 388 A2 | 9/2012 |

(Continued)

OTHER PUBLICATIONS

Klumpner C. et al., "Evaluation of the converter topologies suited for integrated motor drives", Conference Record of the 2003 IEEE Industry Applications Conference, 38th. IAS Annual Meeting, Salt Lake City, UT, Oct. 12-16, 2003, IEEE, vol. 2, Oct. 12, 2003 (Oct. 12, 2003), pp. 890-897.

(Continued)

Primary Examiner — Adolf D Berhane
(74) Attorney, Agent, or Firm — McDermott Will & Emery LLP

(57) ABSTRACT

A semiconductor device includes a rectifier circuit that rectifies an AC input voltage, a zero-cross detection circuit that detects a zero-cross of the AC input voltage, a control circuit that turns on the rectifier circuit at a timing determined by the zero-cross detected by the zero-cross detection circuit and a predetermined phase angle, and the phase angle is set so that an output voltage of the rectifier circuit is gradually increased.

15 Claims, 10 Drawing Sheets

(56) References Cited

U.S. PATENT DOCUMENTS

2017/0150569 A1* 5/2017 Hayashi .............. H05B 45/10
2019/0348833 A1 11/2019 Sun et al.

FOREIGN PATENT DOCUMENTS

| EP | 2 871 760 A1 | 5/2015 |
| JP | 04-138063 A | 5/1992 |
| JP | 2001-186768 A | 7/2001 |

OTHER PUBLICATIONS

Extended European Search Report issued in corresponding European Patent Application Na 20181673.3-1201, dated Oct. 22, 2020.
M. Alam et al., "An Inrush Limited, Surge Tolerant Hybrid Resonant Bridgeless PWM AC-DC PFC Converter", 2014 IEEE Energy Conversion Congress and Exposition (ECCE) pp. 5647-5651.

* cited by examiner

SEMICONDUCTOR DEVICE

CROSS-REFERENCE TO RELATED APPLICATIONS

The disclosure of Japanese Patent Application No. 2019-116803 filed on Jun. 24, 2019 including the specification, drawings and abstract is incorporated herein by reference in its entirety.

BACKGROUND

The present invention relates to an inrush current preventing technique of semiconductor device that performs power conversion.

The Background of the Invention

As a power supply device for converting AC power into DC power, a switching power supply device for converting the AC input voltage to the DC output voltage by controlling on and off of the switching elements is widely known.

Further, in the switching power supply device, it is common to use a PFC (Power Factor Correction) circuit in order to suppress a deterioration of the power factor due to a phase difference between the input voltage and the input current and a generation of harmonics.

The switching power supply device is required to be highly reliable because the generated power is directly related to an operation quality of circuit to which it is supplied. An inrush current countermeasure is known as a method for enhancing reliability. Non-patent Document 1 describes a circuit for limiting inrush current by connecting a resistor and PTC (Positive Temperature Coefficient) in series with a line (FIG. 4). The resistor and PTC can be short-cut with a switch and a relay when they are not needed. Also in FIG. 5, a circuit for limiting the inrush current with a resistor (Rinrush) is described. Rinrush is normally short-circuited by a thyristor (SCR). FIG. 6 shows a circuit for limiting the inrush current by adding capacitance Cr.

PRIOR-ART DOCUMENT

Non-Patent Document

[Non-patent Document 1] Muntasir Alam, et al., "An Inrush Limited, Surge Tolerant Hybrid Resonant Bridgeless PWM AC-DC PFC Converter" 2014 IEEE Energy Conversion Congress and Exposition (ECCE) p. 5647-5651

SUMMARY

However, adding the switch, relay, thyristor, and capacitor to prevent inrush current in the power converter device leads to high costs. In particular, for the switch and relay, there is a disadvantage that the power converter device is degraded because opening and closing numbers of the switch and relay throughout their lifetime is extremely small.

Other objects and novel features will become apparent from the description of the specification and drawings.

A semiconductor device according to one embodiment includes a rectifier circuit that rectifies an AC input voltage, a zero-cross detection circuit that detects a zero-cross of the AC input voltage, a control circuit that turns on the rectifier circuit at a timing determined by the zero-cross detected by the zero-cross detection circuit and a predetermined phase angle, and the phase angle is set so that an output voltage of the rectifier circuit is gradually increased.

A semiconductor device according to one embodiment allows power conversion with an inrush current countermeasure.

DETAILED DESCRIPTION

Figure 1:
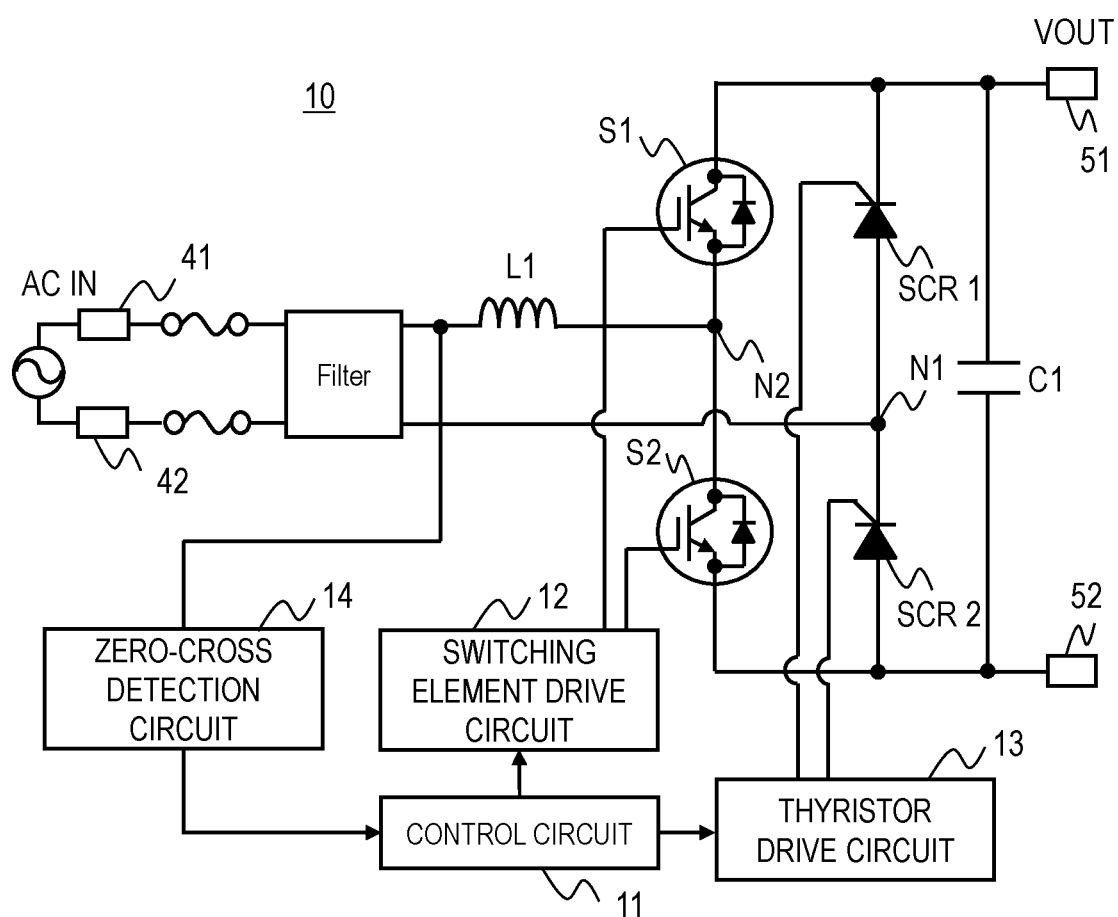
FIG. 1 is a block diagram of a semiconductor device according to an embodiment.

Hereinafter, a semiconductor device according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments may be arbitrarily combined with each other.

An Embodiment

FIG. 1 is a block diagram showing a configuration of semiconductor device 10 according to a first embodiment.

As shown in FIG. 1, semiconductor device 10 includes a switching element S1 as a first switching element, a switching element S2 as a second switching element, a thyristor SCR 1 as a first thyristor, a thyristor SCR 2 as a second thyristor, a capacitor C1, a coil L1, a control circuit 11, a switching element drive circuit 12, a thyristor drive circuit 13, and a zero-cross detection circuit 14. This configuration is similar to a bridgeless totem pole type power factor correction circuit, but differs from a conventional bridgeless totem pole type power factor correction circuit in that semiconductor device 10 includes thyristors SCR 1, SCR 2, a thyristor drive circuit 13. Further, an operation of the control circuit 11 and the switching element drive circuit 12 is also different from the general bridgeless totem pole type power factor correction circuit. The details will be described later. Semiconductor device 10 is a power supply device as a power conversion device that converts the AC input voltage (AC IN) supplied to the first input terminal 41 and the second input terminal 42 to a direct current voltage (VOUT) and outputs to the first output terminal 51 and the second output terminal 52.

Switching element S1 is disposed between the first output terminal 51 and the node N2 which is coupled to the first input terminal 41 via the coil L1 and the Filter. Switching element S2 is disposed between the node N2 and the second output terminal 52. Switching elements S1, S2 are power transistors, for example IGBT (Insulated Gate Bipolar Transistor) and power MOS. The thyristor SCR 1 is disposed between the first output terminal 51 and the node N1 which is coupled to the second input terminal 42 via the Filter. The thyristor SCR 2 is disposed between the node N1 and the second output terminal 52.

Switching element drive circuit 12 turns on or off the switching element S1, S2 based on an instruction of the control circuit 11. Similarly, the thyristor drive circuit 13 turns on or off the thyristors SCR 1, SCR 2 based on the instruction of the control circuit 11.

Zero-cross detection circuit 14 monitors the AC input voltage and detects the timing at which the amplitude becomes zero cross. The detection result is notified to the control circuit 11.

Control circuit 11 has two functions. The first function is a function during normal operation and is a control function equivalent to the conventional bridgeless totem pole type power factor correction circuit. However, the control of the thyristors SCR 1, SCR 2 differs from the conventional one because the conventional bridgeless totem pole type power factor correction circuit does not have thyristors SCR 1, SCR 2. More particularly, the control circuit 11, by controlling the switching elements S1, S2 based on a predetermined control method, performs power factor correction using the coil L1. At this time, the thyristors SCR 1, SCR 2 are alternately turned on based on the timings of the zero crossings of the AC input voltages detected by the zero-cross detection circuit 14. Specifically, when a voltage of the connecting point of the switching elements S1 and S2 (hereinafter, referred to as node N2) changes from a positive voltage to a negative voltage and a voltage of the connection point of the thyristors SCR 1 and SCR 2 (hereinafter, referred to as node N1) changes from a negative voltage to a positive voltage, the thyristor SCR 1 is turned on, the thyristor SCR 2 is turned off. When the voltage at the node N2 changes from a negative voltage to a positive voltage, and the voltage at the node N1 changes from a positive voltage to a negative voltage, the thyristor SCR 1 turns off and the thyristor SCR 2 turns on. As a result, semiconductor device 10 is equivalent to a conventional bridgeless totem-pole type power factor correction circuit.

The second function of the control circuit 11 is a control function after the AC input voltage is turned on. In the second function, the switching elements S1, S2 are always off. Further, the thyristors SCR 1, SCR 2, based on the timing of the zero-cross detected by the zero-cross detection circuit 14, is turned on alternately at a predetermined timing (phase angle). The control circuit 11 performs the second function until the above-described normal operation is performed.

Figure 2:
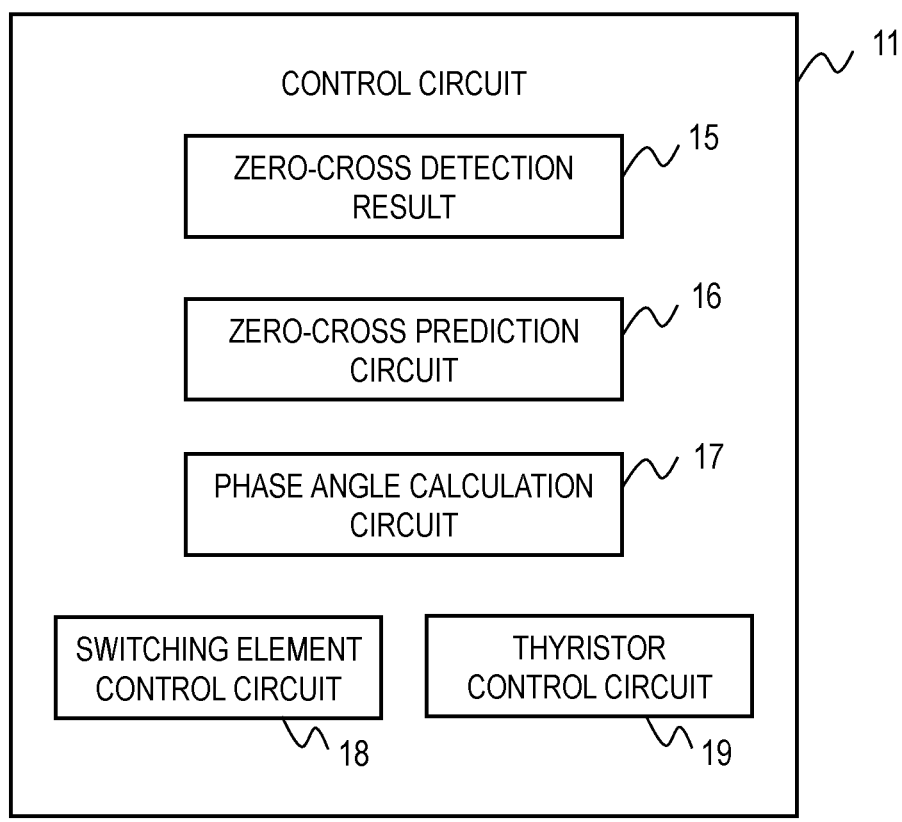
FIG. 2 is a block diagram of a control circuit according to the embodiment.

FIG. 2 is a block diagram of the control circuit 11. The zero-cross detection result 15 stores information about the timing of the zero crossing of the AC input voltage detected by the zero-cross detection circuit 14. Zero-cross prediction circuit 16, from the information stored in the zero-cross detection result 15, predicts a timing of next zero crossing of the AC input voltage Phase angle calculation circuit 17 calculates a timing with a predetermined phase angle from the timing of next zero crossing of the AC input voltage. Thyristor control circuit 19, during the first functional operation described above, outputs a control signal to the thyristor drive circuit 13 so that the thyristors SCR 1, SCR 2 are turned on alternately based on the timing of the zero-crossing predicted by the zero-cross prediction circuit 16. Further, the thyristor control circuit 19, during the second functional operation described above, outputs a control signal to the thyristor drive circuit 13 so that the thyristors SCR 1, SCR 2 are turned on at the timing calculated by the phase angle calculation circuit 17. Switching element control circuit 18, during the first functional operation described above, conventionally, in order to perform the power factor correction, and outputs a control signal for controlling the switching element S1, S2 to the switching element drive circuit 12. Further, the switching element control circuit 18, during the second functional operation described above, outputs a control signal to the switching element drive circuit 12 so that the switching elements S1, S2 are always off. Here, the control circuit 11 may be a dedicated circuit or may be controlled by a CPU.

Operations of zero-cross detection circuit 14, zero-cross prediction circuit 16 and phase angle calculation circuit 17 will be described in more detail with reference to FIG. 3.

Figure 3:
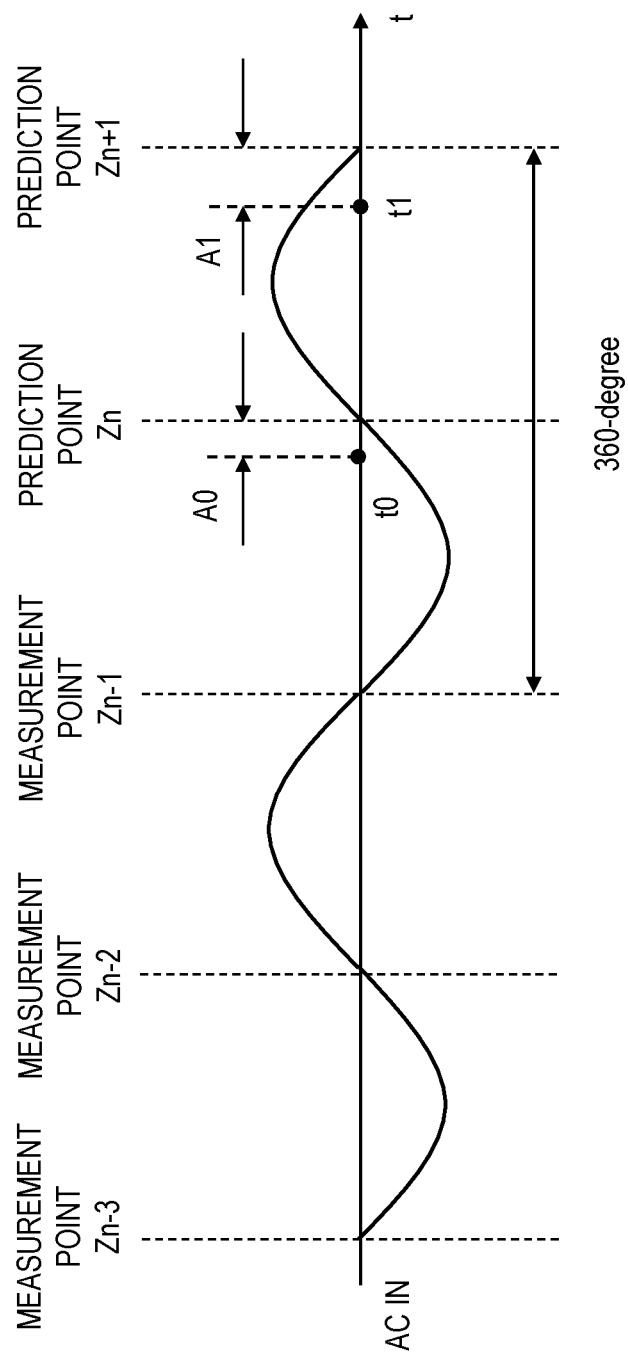
FIG. 3 is a timing chart showing an operation of the control circuit.

FIG. 3 shows a waveform of the AC input voltage. Zero-cross detection circuit 14, after the AC input voltage is turned on, measures some zero-cross timings of the AC input voltage. In FIG. 3, the three points of Zn−3, Zn−2, Zn−1 are measured as the timing of zero-cross. The result of the measurement is sent to the control circuit 11. The measurement points are not limited to three.

Zero-cross prediction circuit 16, from the measurement points Zn−3, Zn−2, Zn−1, predicts a timing of next zero-cross of the AC input voltage. For example, since a half cycle of the AC input voltage can be measured from an interval of Zn−3 and Zn−2, it is possible to predict Zn which is a next zero-cross timing from Zn−1. Alternatively, by taking a mean value of the interval between Zn−3 and Zn−2 and the interval between Zn−2 and Zn−1, the half cycle of the AC input voltage may be determined. Zn+1, which is a prediction point of the timing of zero crossing, is also obtained in the same manner.

Next, an operation of the phase angle calculation circuit 17 will be described. The phase angle calculation circuit 17, based on the prediction point predicted by the zero-cross prediction circuit 16, determines timings of turning on the thyristors SCR 1 and SCR 2. Specifically, as shown in FIG. 3, the timing t0 at which the phase angle is preceding from Zn by A0 is determined. Note that the phase angle (also referred to as phase) is a deviation with respect to the half cycle of the AC input voltage (180 degrees). Similarly, for Zn+1, the timing t1 at which the phase angle is preceding from Zn+1 by A1 is determined. Here, A0<A1. That is, the phase angle calculation circuit 17 determines the timings so that the phase angle is gradually increased with respect to a plurality of prediction points.

Figure 4:
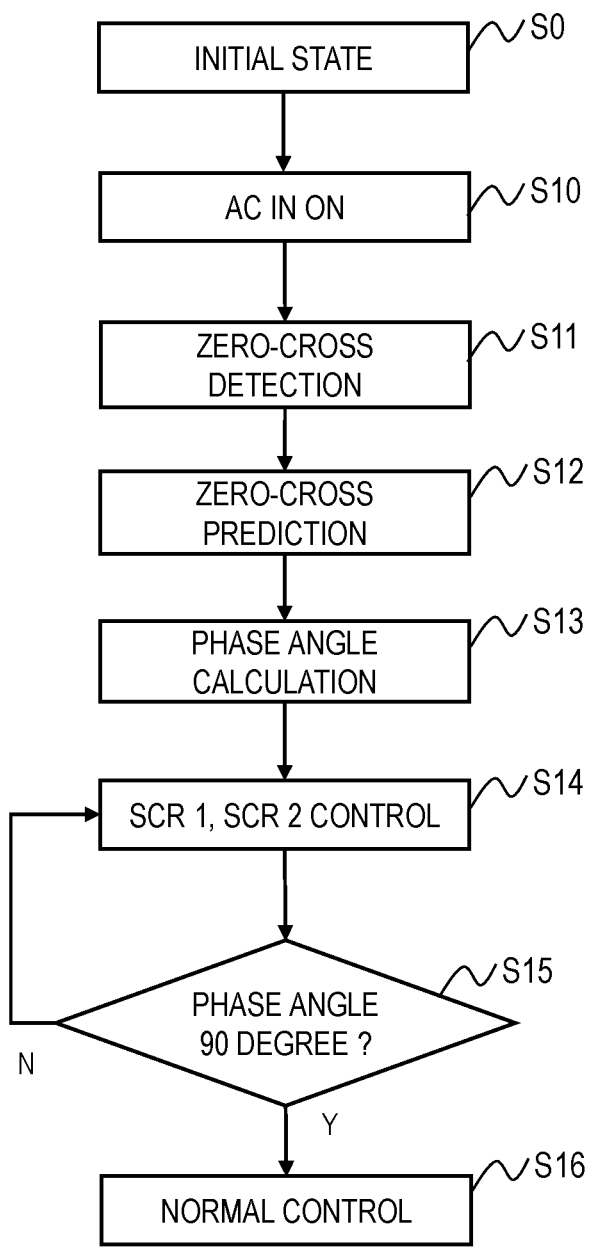
FIG. 4 is a flowchart showing an operation of the semiconductor device.
Figure 5:
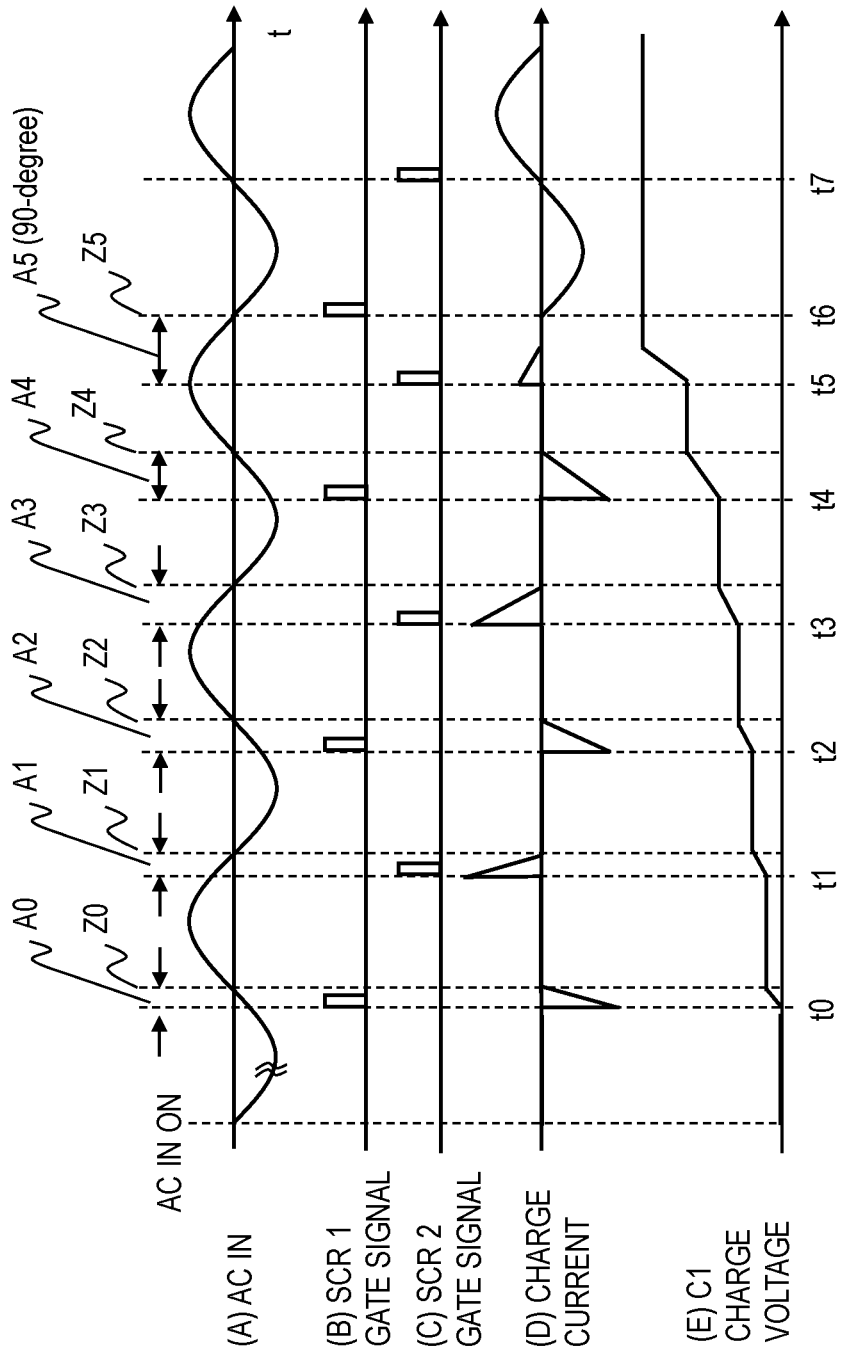
FIG. 5 is a timing chart showing the operation of the semiconductor device.

Next, the operation of semiconductor device 10 will be described. FIG. 4 is a flowchart showing the operation of semiconductor device 10. Further, FIG. 5 is a timing chart showing the operation of semiconductor device 10.

First, in the initial state before the AC input voltage is input, each of the elements (switching elements S1, S2, the thyristors SCR 1, SCR 2) is off state. Control circuit 11, by controlling the switching element drive circuit 12 and the thyristor drive circuit 13, outputs gate signals and control signals to turn off each element (step S0). In present embodiment, each element turns off when the gate signals and the control signals are a ground voltage (0V), and each element turns on when the gate signals and the control signals are a positive high voltage, but not limited thereto.

When the AC input voltage is supplied (step S10), the zero-cross detection circuit 14 detects the zero-cross timing of the AC input voltage, and notifies the control circuit 11 of the detection result (step S11).

Zero-cross prediction circuit 16, as described in FIG. 3, predicts the next zero-cross timing from the zero-cross timing detected by the zero-cross detection circuit 14 (step S12). In FIG. 5, Z0 to Z5 are predicted timings. In FIG. 5, the zero-cross timing detected by the zero-cross detection circuit 14 is omitted.

The phase angle calculation circuit 17 calculates phase angles A0 to A5 with respect to Z0 to Z5 which are the predicted zero-cross timings (step S13). As explained in FIG. 3, the phase angles (A0 to A5) gradually increase. For example, when an initial value is 15 degrees and the amount of increase is 15 degrees, A0=15 degrees, A1=30 degrees, A2=45 degrees, A3=60 degrees, A4=75 degrees, and A5=90 degrees. The phase angle calculation method is not limited thereto. For example, the increase amount may not be constant, or A0=A1, A2=A3, and A4=A5.

The thyristor control circuit 19 generates control signals for turning on the thyristors SCR 1 and SCR 2 using Z0 to Z5 predicted by the zero-cross prediction circuit 16 and A0 to A5 calculated by the phase angle calculation circuit 17 (step S14). In the case of Z0, a control signal for turning on the thyristor SCR 1 at a timing t0 preceding from Z0 by A0 (15 degrees) is generated. For Z1, a control signal for turning on SCR 2 at a timing t1 preceding from Z1 by A1 (30 degrees) is generated. Similarly, control signals for turning on the thyristor SCR 1 at t2, t4, and control signals for turning on the thyristor SCR 2 at t3, t5 are generated.

The thyristor drive circuit 13 turns on the thyristors SCR 1, SCR 2 based on the control signals generated by the thyristor control circuit 19. As shown in FIG. 5, at the timing t0, the AC input voltage is a negative voltage. That is, a positive voltage is applied to the node N1. When the thyristor SCR 1 is turned on at the timing of t0, a current flows via the node N1, the thyristor SCR 1, the capacitor C1, the reflux diode of the switching element S2, node N2 and the coil L1. At the timing t1, the AC input voltage is a positive voltage. That is, a positive voltage is applied to the node N2. When the thyristor SCR 2 is turned on at the timing of t1, a current flows through the node N2, the reflux diode of the switching element S1, the capacitor C1, the thyristor SCR 2, the node N1. The same applies to timings t2-t5. That is, at this time, the switching elements S1, S2, the thyristors SCR 1, SCR 2 will function as a rectifier circuit.

We now focus on the voltage at node N1. When the voltage at t0 is V0 and the voltage at t2 is V2, V2>V0. This is because, as described above, since the phase angle is gradually increased, t2 is a timing farther from the zero-cross timing than t1. In the range of 0 to 90 degrees of the AC input voltage, the voltage becomes higher as it moves away from the zero-cross. The same applies to the voltage of node N2. Therefore, from t0 to t5, the voltage applied to the capacitor C1 gradually increases (FIG. 5 (E)).

At timing t5 (phase angle 90 degrees) (step S15), the control circuit 11 ends the control for a turn-on of the AC input voltage (the second function), and proceeds to the normal control (the first function) (step S16). In the normal control, the control circuit 11, at the zero-cross timing of the AC input voltage, controls so that the thyristors SCR 1, SCR 2 are turned on alternately (t6, t7 in FIG. 5). Further, the control circuit 11 performs power factor correction by controlling the switching elements S1, S2. The control method of the switching elements S1, S2 for power factor correction will be omitted because it is the same as the conventional.

As described above, in present embodiment, a power conversion with a measure against inrush current can be performed without any additional switching element, relay, capacitor, and the like.

First Modified Example

Figure 6:
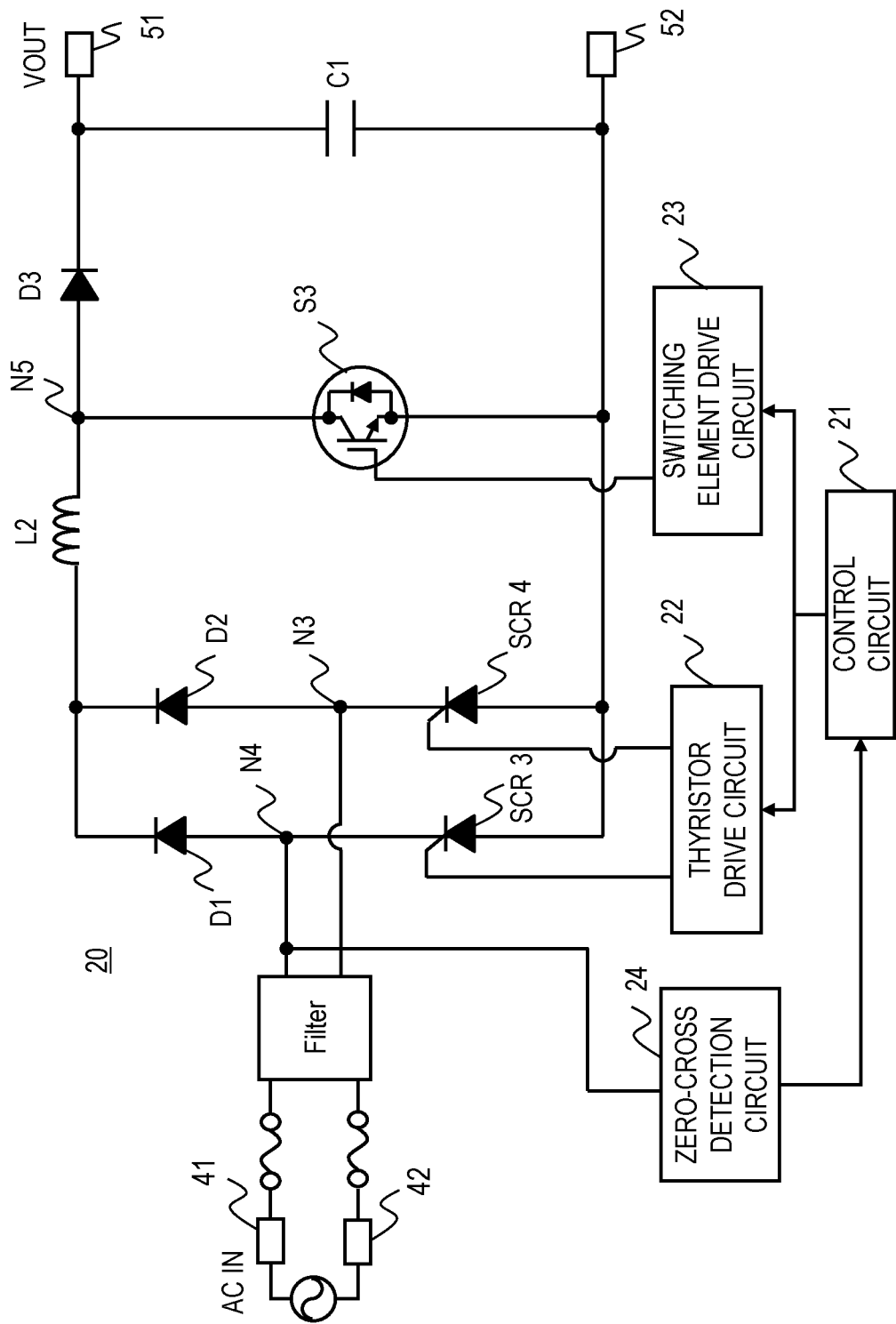
FIG. 6 is a block diagram of a first modified example.

FIG. 6 is a block diagram showing the configuration of a semiconductor device 20 according to a first modified example.

In the embodiment, the circuit is based on a bridgeless totem-pole type power factor correction circuit, whereas the first modified example combines a rectifier circuit (diode-bridge) with a boost-type PFC circuit, and is particularly based on a single-type circuit. As shown in FIG. 6, semiconductor device 20 includes a rectifying diode D1 as a first diode, a rectifying diode D2 as a second diode, a thyristor SCR 3 as a third thyristor, a thyristor SCR 4 as a fourth thyristor, a switching element S3, a coil L2 as a second coil, a boost diode D3 as a third diode, a capacitor C1, a control circuit 21, a thyristor drive circuit 22, a switching element drive circuit 23, and a zero-cross detection circuit 24. A conventional rectifier circuit uses rectifier diodes instead of thyristors SCR 3, SCR 4. In this modified example, the inrush current is suppressed by controlling the thyristors SCR 3, SCR 4 when the AC input voltage is turned on. Rectifying diode D1 is disposed between a node N4 coupled to the first input terminal 41 via a Filter and the first output terminal 51 via the coil L2 and the boost diode D3 connected in series. Rectifying diode D2 is disposed between a node N3 coupled to the second input terminal 42 via the Filter and the first output terminal 51 via the coil L2 and the boost diode D3 connected in series. The thyristor SCR 3 is disposed between the nodes N4 and the second output terminal 52. The thyristor SCR 4 is disposed between the nodes N3 and the second output terminal 52. Switching element S3 is disposed between the connection point (node N5) between the coil L2 and the boost diode D3 and the second output terminal 52.

Thyristor drive circuit 22 and the switching element drive circuit 23 perform on/off of the thyristors SCR 3, SCR 4, and the switching element S3 as a third switching element based on an instruction of the control circuit 21.

Zero-cross detection circuit 24 detects a timing of the AC input voltage becomes zero-cross, and notifies the detection result to the control circuit 21. Zero-cross detection circuit 24 is equivalent to the zero-cross detection circuit 14 of the embodiment.

The control circuit 21 has the first function and the second function in the same manner as the control circuit 11 of the embodiment. In the first function (normal operation), similarly to the conventional boost type PFC, the power factor correction of semiconductor device 20 is performed by controlling the switching element S3. However, since a conventional rectifier circuit (diode bridges) does not have thyristors SCR 3, SCR 4, the control of the thyristors SCR 3, SCR 4 differs from the conventional. Specifically, when the voltage of the node N3 changes from a negative voltage to a positive voltage, and the voltage of the node N4 changes from a positive voltage to a negative voltage, the thyristor SCR 3 is turned on, and the thyristor SCR 4 is turned off. Further, when the voltage of node N3 changes from a positive voltage to a negative voltage, and the voltage of node N4 changes from a negative voltage to a positive voltage, the thyristor SCR 3 is turned off, and the thyristor SCR 4 is turned on. As a result, semiconductor device 20 has the same functionality as a conventional rectifier circuit and a boost-type PFC.

The second function of the control circuit 21 is a control function after the AC input voltage is turned on. In this function, the switching element S3 is always off. Thyristors SCR 3, SCR 4 is turned on alternately at a predetermined timing (phase angle) based on the zero-cross timing detected by the zero-cross detection circuit 24. Control circuit 21 performs the second function until a transition to the normal operation. The control circuit 21, like the control circuit 11 of the embodiment, has a zero-cross prediction circuit, a phase angle calculation circuit, a switching element control circuit, a thyristor control circuit.

Figure 7:
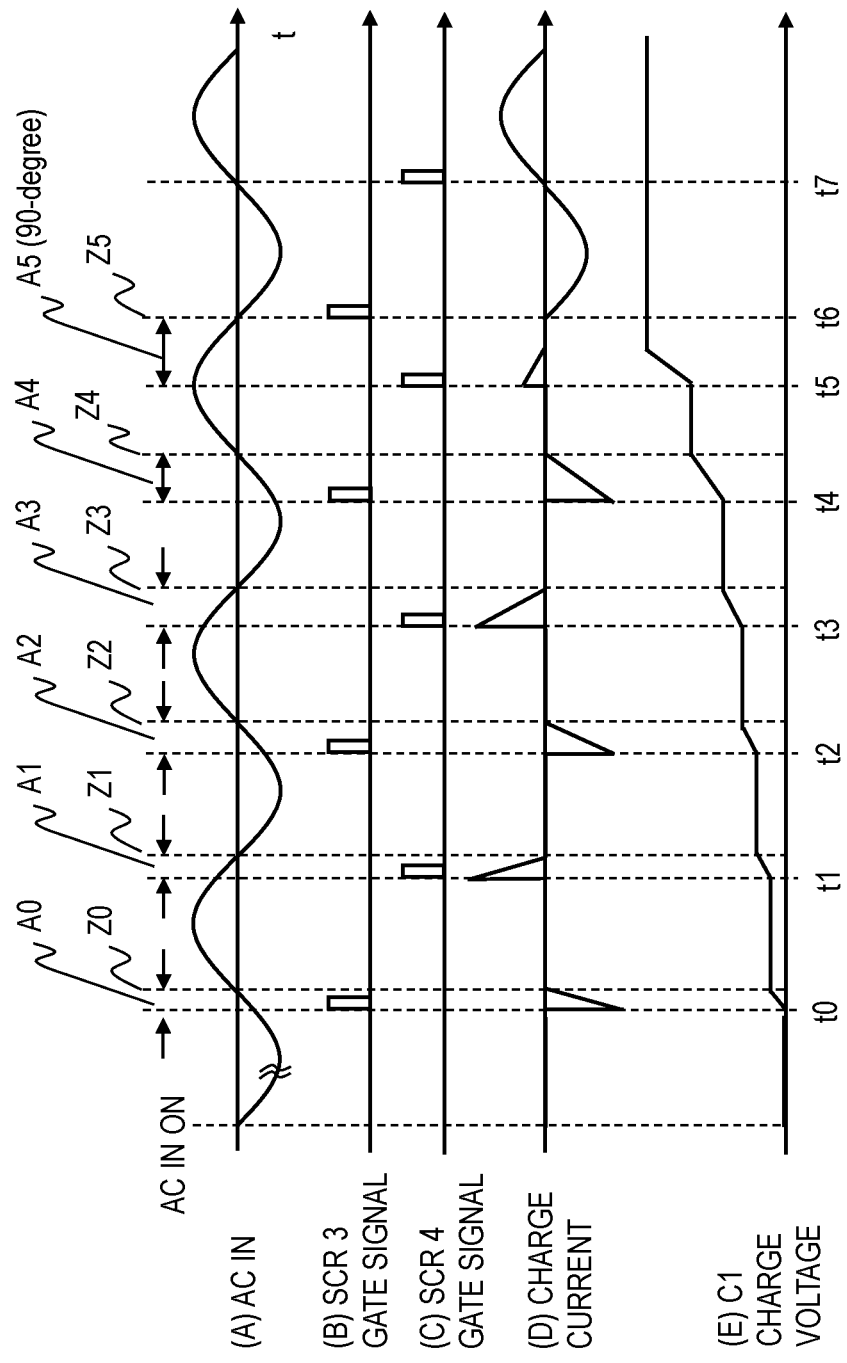
FIG. 7 is a timing chart showing an operation of the semiconductor device according to the first modified example.

Next, the operation of semiconductor device 20 according to the first modified example will be described. FIG. 7 is a timing chart showing the operation of semiconductor device 20.

The operation of semiconductor device 20 is similar to that of the embodiment. The thyristor SCR 1 of FIG. 1 corresponds to the thyristor SCR 3 of FIG. 6, and the thyristor SCR 2 of FIG. 1 corresponds to the thyristor SCR 4 of FIG. 6. Further, the timing chart of the gate signal of the thyristor SCR 1 in FIG. 5 (B) corresponds to the timing chart of the gate signal of SCR 3 in FIG. 6, the timing chart of the gate signal of SCR 2 in FIG. 5 (C) corresponds to the timing chart of the gate signal of SCR 4 in FIG. 6.

As in the description of FIGS. 2-5, the control circuit 21 turns on the thyristors SCR 3, SCR 4 at a timing t0 to t5 in which the phase angle is shifted by A0 to A5 with respect to Z0 to Z5, which are the zero-cross timings of the AC input voltage detected by the zero-cross detection circuit.

At the timing t5 (phase angle 90-degree), control circuit ends the control (the second function) for the AC input voltage and proceeds to the normal control (the first function). In the normal control, the control circuit 21 controls so that the thyristors SCR 3, SCR 4 are turned on alternately at the zero-cross timing of the AC input-voltage. Further, the control circuit 21 performs power factor correction by controlling the switching element S3. The control method of the switching element S3 for power factor correction will be omitted because it is the same as the conventional.

As described above, the rectifier circuit and the booster-type PFC circuit of the present first modified example can obtain the same effect as that of the embodiment.

Second Modified Example

Figure 8:
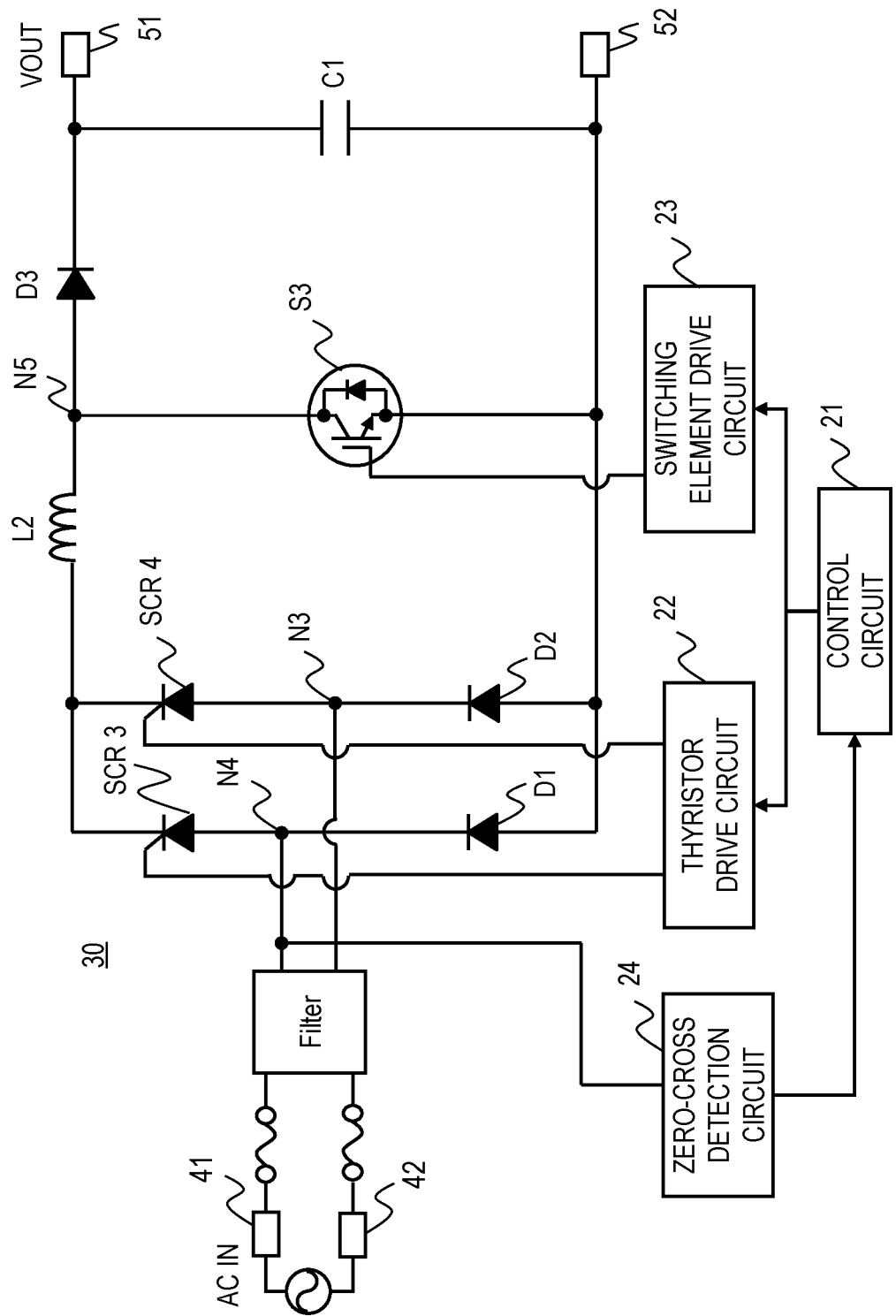
FIG. 8 is a block diagram of a semiconductor device according to a second modified example.

FIG. 8 is a block diagram showing a configuration of semiconductor device 30 according to a second modified example.

A difference between this second modified example and the first modified example is points where rectifier diodes D1, D2, and thyristors SCR 3, SCR 4 are coupled. That is, the thyristor SCR 3 is disposed between a node N4 coupled to the first input terminal 41 via a Filter and the first output terminal 51 via a coil L2 and the boost diode D3 connected in series. The thyristor SCR 4 is disposed between a node N3 coupled to the second input terminal 42 via the Filter and the first output terminal 51 via the coil L2 and the boost diode D3 connected in series. Rectifying diode D1 is disposed between the node N4 and the second output terminal 52. Rectifying diode D2 is disposed between the node N3 and the second output terminal 52. Since the operation of semiconductor device 30 is the same as that of semiconductor device 20, the detail is omitted.

The present second modified example can obtain the same effects as those of first modified example.

Third Modified Example

Figure 9:
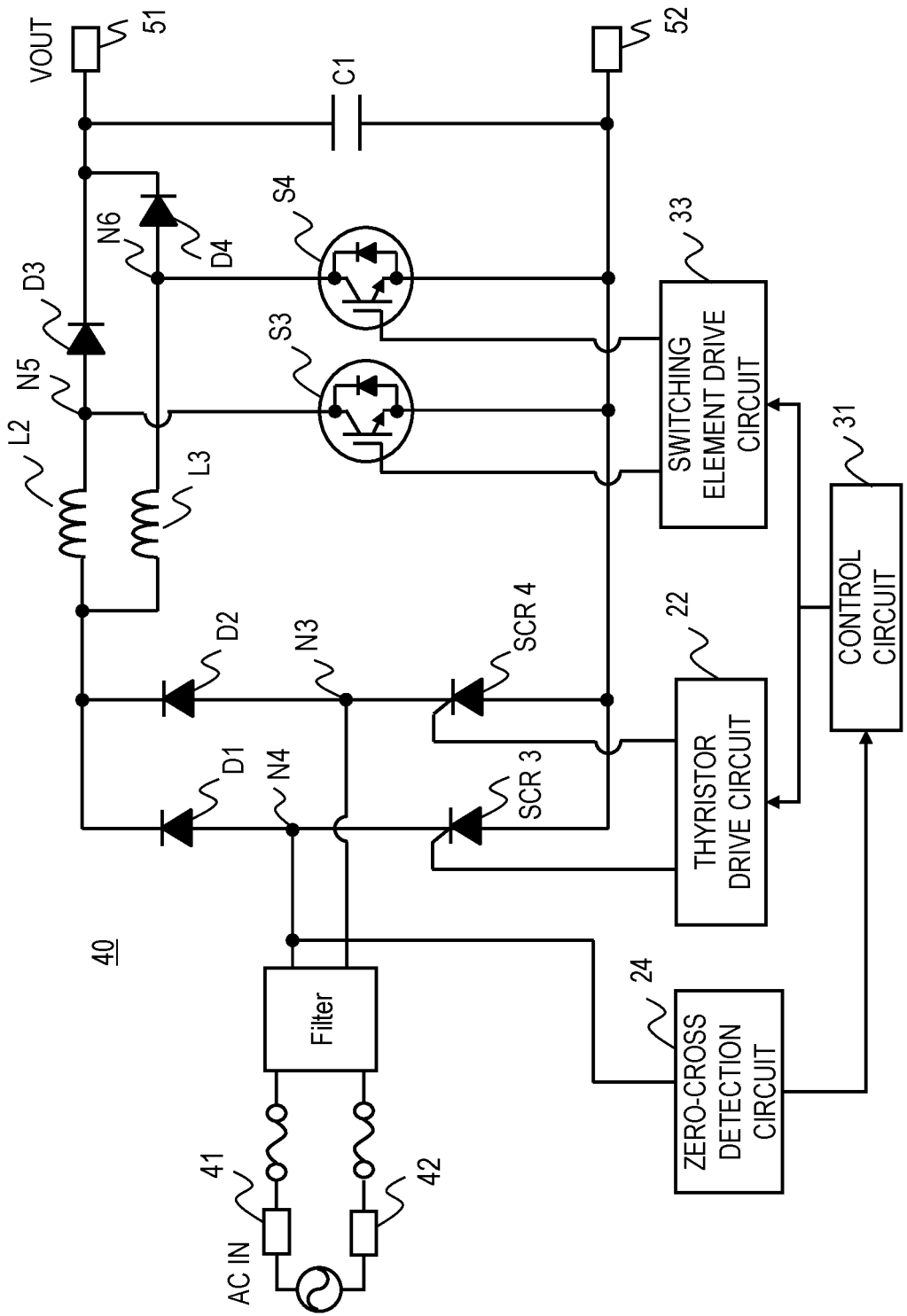
FIG. 9 is a block diagram of a semiconductor device according to a third modified example.

FIG. 9 is a block diagram showing the configuration of a semiconductor device 40 according to a third modified example.

This third modified example is based on a rectifier circuit and a boost-type interleaved PFC circuit. In the interleaved PFC circuit, a coil L3 as a third coil, a boost diode D4 as a fourth diode, and a switching element S4 as a fourth switching element are added to a single-type PFC circuit (first modified example). The coil L3 and the boost diode D4 are arranged in series between the rectifying diodes D1, D2 and the first output terminal 51, the switching element S4 is disposed between the connection point (node N6) between the coil L3 and the boost diode D4 and the second output terminal 52. Like first modified example, the rectifier circuits composed of rectifier diodes D1, D2, and thyristors SCR 3, SCR 4 differs from the conventional.

The operation of semiconductor device 40 is the same as that of first modified example except for the interleave operation. Like the embodiment and first modified example, the control circuit 31 has the first function and the second function. In the first function (normal operation), similarly to the conventional interleaved PFC circuit, the power factor of semiconductor device 40 is improved by controlling the switching elements S3, S4. However, since conventional rectifier circuit does not have the thyristors SCR 3, SCR 4, the control of the thyristors SCR 3, SCR 4 differs from the conventional one. The control of thyristors SCR 3, SCR 4 is similar to first modified example. As a result, semiconductor device 40 is equivalent to the conventional rectifier circuit and the boost-type interleaved PFC circuit.

The second function of the control circuit 31 is a control function after the AC input voltage is turned on. The operation of this function is the same as that of first modified example, and therefore detailed description thereof is omitted.

In the semiconductor device 40 according to present third modified example, in the rectifier circuit and the boost type interleaved PFC circuit, it is possible to obtain the same effects as the embodiment.

Fourth Modified Example

Figure 10:
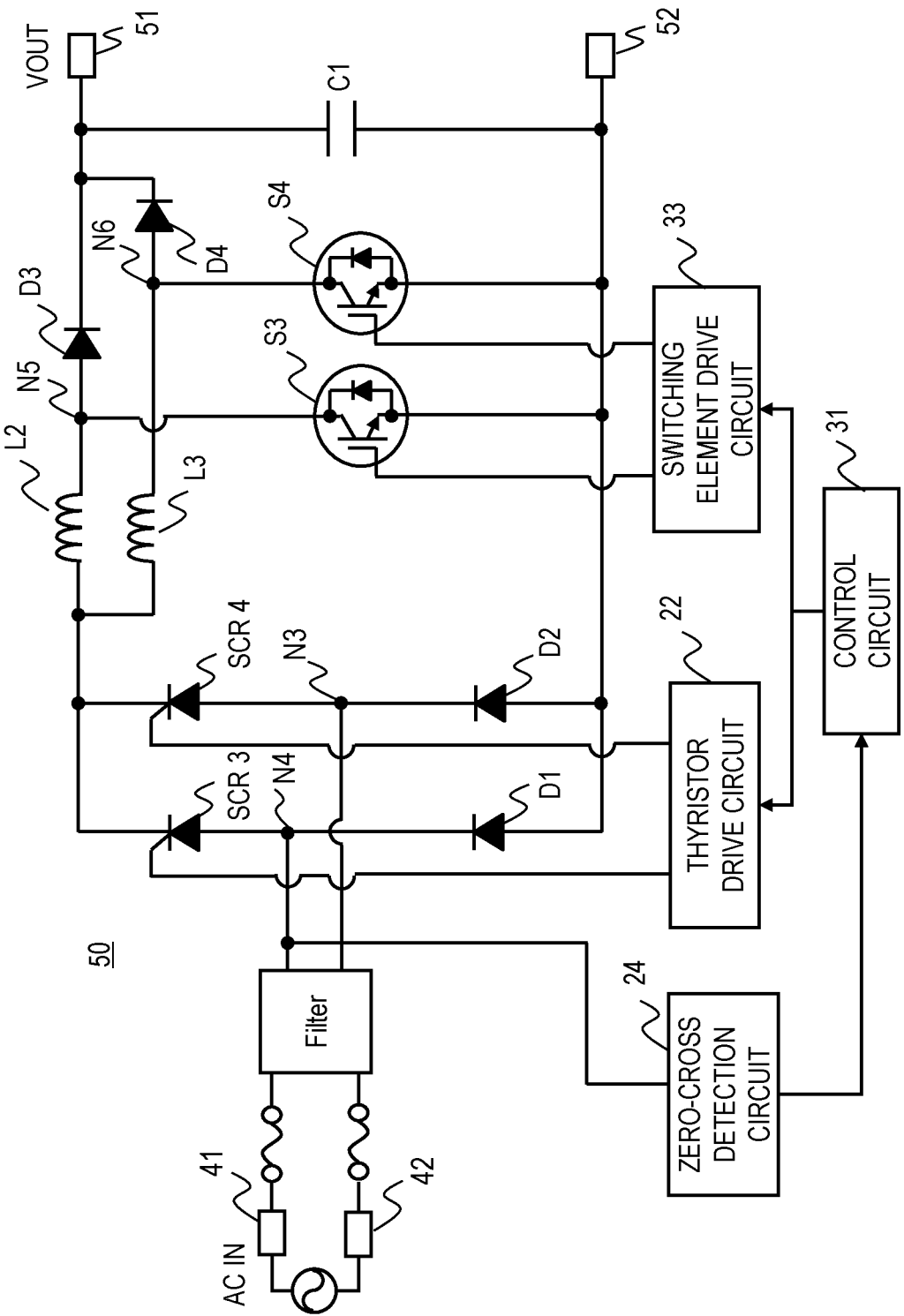
FIG. 10 is a block diagram of a semiconductor device according to a fourth modified example.

FIG. 10 is a block diagram showing the configuration of a semiconductor device 50 according to a fourth modified example.

The difference between this fourth modified example and third modified example is that the rectifier diodes D1, D2, and thyristors SCR 3, SCR 4 are coupled similar to the second modified example. Since the operation of semiconductor device 50 is the same as that of semiconductor device 40, the detail is omitted.

The present fourth modified example can obtain the same effects as those of third modified example.

It should be noted that the present invention is not limited to the above-mentioned embodiments, and various modifications can be made without departing from the gist thereof.

What is claimed is:
1. A semiconductor device comprising:
a rectifier circuit that rectifies an AC input voltage;
a zero-cross detection circuit that detects a zero-cross of the AC input voltage; and a control circuit that turns on the rectifier circuit at a timing determined by the zero-cross detected by the zero-cross detection circuit and a predetermined phase angle, wherein the predetermined phase angle is set so that an output voltage of the rectifier circuit is gradually increased, wherein the control circuit includes a zero-cross prediction circuit that predicts a next zero-cross timing from the zero-cross detected by the zero-cross detection circuit, and the timing of turning on the rectifier circuit is determined by the predicted next zero-cross timing and the predetermined phase angle.

2. The semiconductor device according to claim 1, wherein the phase angle is set to be gradually increased.

3. The semiconductor device according to claim 2, further comprising:

first and second input terminals that input the AC input voltage; and first and second output terminals, wherein the rectifier circuit includes first and second switching elements and first and second thyristors, wherein the first switching element is disposed between the first input terminal and the first output terminal, wherein the second switching element is disposed between the first input terminal and the second output terminal, wherein the first thyristor is disposed between the second input terminal and the first output terminal, wherein the second thyristor is disposed between the second input terminal and the second output terminal, and wherein the control circuit controls turn-ons of the first and second thyristors.

4. The semiconductor device according to claim 3, wherein a coil is disposed between the first input terminal and the first and second switching elements, and wherein a capacitor is disposed between the first and second output terminals.

5. The semiconductor device according to claim 4, wherein the control circuit performs a power factor correction by controlling the first and second switching elements when the phase angle reaches a predetermined value.

6. The semiconductor device according to claim 2, further comprising:

first and second input terminals that inputs the AC input voltage; and first and a second output terminals, wherein the rectifier circuit includes first and second diodes and third and fourth thyristors, wherein the first diode is disposed between the first input terminal and the first output terminal, wherein the second diode is disposed between the second input terminal and the first output terminal, wherein the third thyristor is disposed between the first input terminal and the second output terminal, wherein the fourth thyristor is disposed between the second input terminal and the second output terminal, and wherein the control circuit controls turn-ons of the third and fourth thyristors.

7. The semiconductor device according to claim 6, wherein a second coil and a third diode are arranged in series between the first and second diodes and the first output terminal, wherein a third switching element is disposed between a connection point of the second coil and the third diode and the second output terminal, and wherein a capacitor is disposed between the first and second output terminals.

8. The semiconductor device according to claim 7, wherein the control circuit performs a power factor correction by controlling the third and fourth thyristors and the third switching element when the phase angle reaches a predetermined value.

9. The semiconductor device according to claim 8, wherein a third coil and a fourth diode are further arranged in series between the first and second diodes and the first output terminal, and wherein a fourth switching element is disposed between a connection point of the third coil and the fourth diode and the second output terminal.

10. The semiconductor device according to claim 9, wherein the control circuit performs a power factor correction by controlling the third and fourth thyristors and the third and fourth switching elements when the phase angle reaches a predetermined value.

11. The semiconductor device according to claim 2, further comprising:

first and second input terminals that inputs the AC input voltage; and first and a second output terminals, wherein the rectifier circuit includes first and second diodes and third and fourth thyristors, wherein the third thyristor is disposed between the first input terminal and the first output terminal, wherein the fourth thyristor is disposed between the second input terminal and the first output terminal, wherein the first diode is disposed between the first input terminal and the second output terminal, wherein the second diode is disposed between the second input terminal and the second output terminal, and wherein the control circuit controls turn-ons of the third and fourth thyristors.

12. The semiconductor device according to claim 11, wherein a second coil and a third diode are arranged in series between the third and fourth thyristors and the first output terminal, wherein a third switching element is disposed between a connection point of the second coil and the third diode and the second output terminal, and wherein a capacitor is disposed between the first and second output terminals.

13. The semiconductor device according to claim 12, wherein the control circuit performs a power factor correction by controlling the third and fourth thyristors and the third switching element when the phase angle reaches a predetermined value.

14. The semiconductor device according to claim 13, wherein a third coil and a fourth diode are further arranged in series between the third and fourth thyristors and the first output terminal, further, and wherein a fourth switching element is disposed between a connection point of the third coil and the fourth diode and the second output terminal.

15. The semiconductor device according to claim 14, wherein the control circuit performs a power factor correction by controlling the third and fourth thyristors and the third and fourth switching elements when the phase angle reaches a predetermined value.

\* \* \* \* \*